Inventor:
Daniel T. Fahey
By Hofgren, Wegner,
Allen, Stellman & McCord
Attys

Feb. 17, 1970             D. T. FAHEY             3,495,536
CONTROL FOR FLUID TRANSLATING APPARATUS
Filed May 14, 1968             5 Sheets-Sheet 2
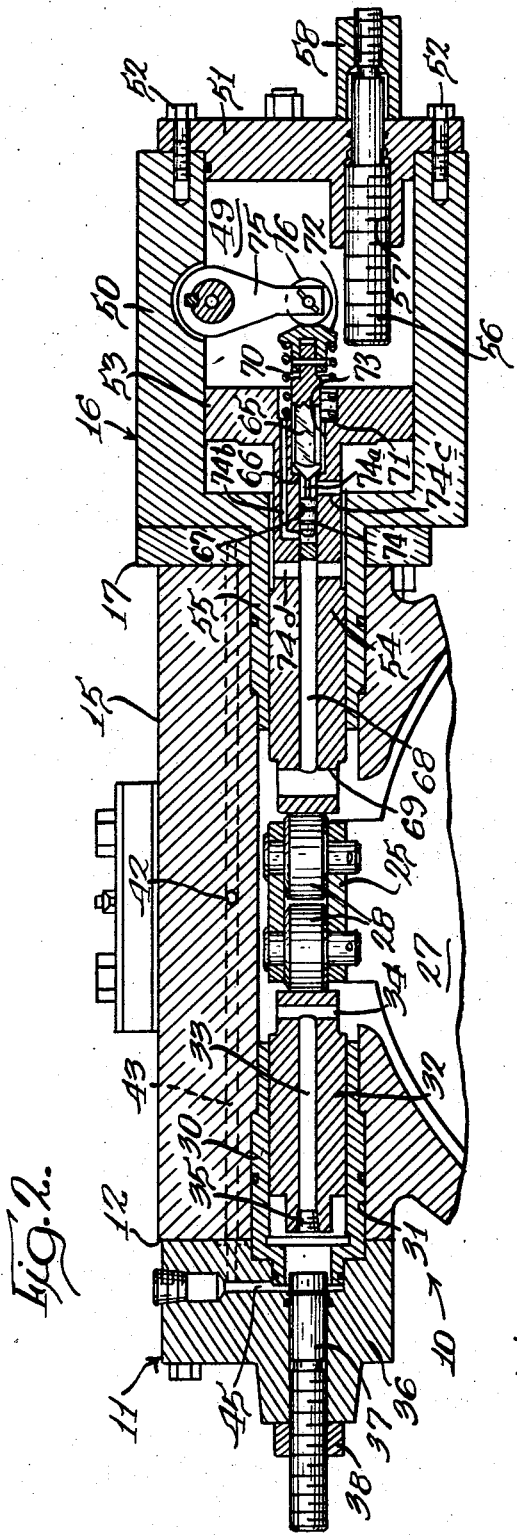
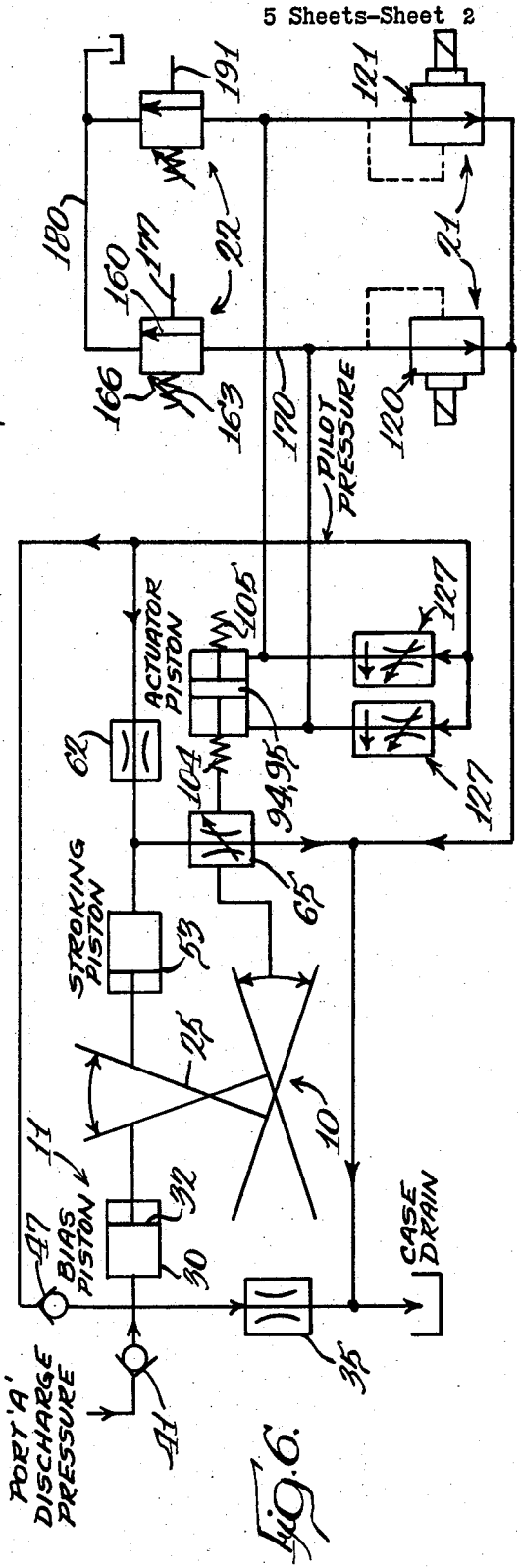

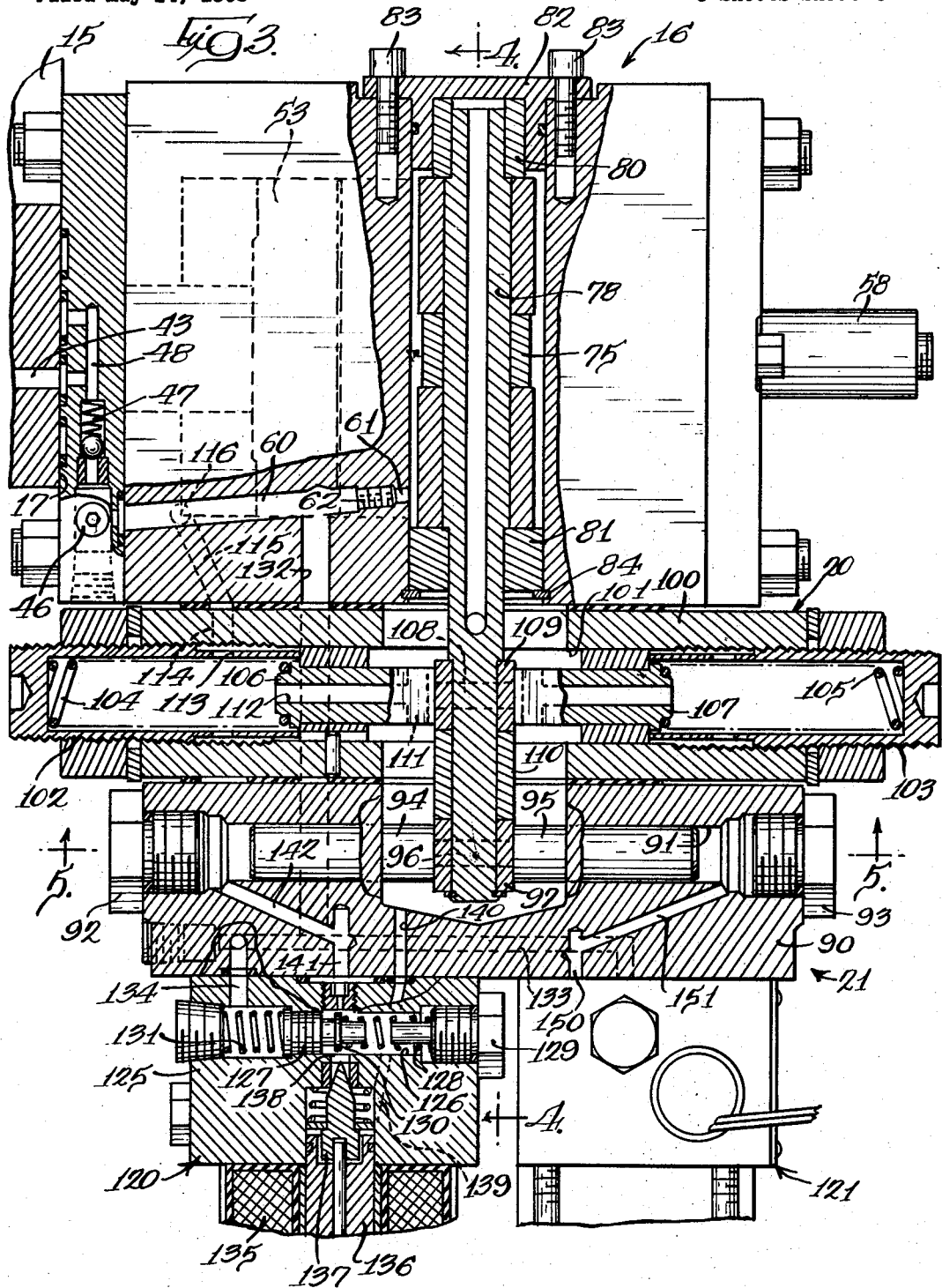

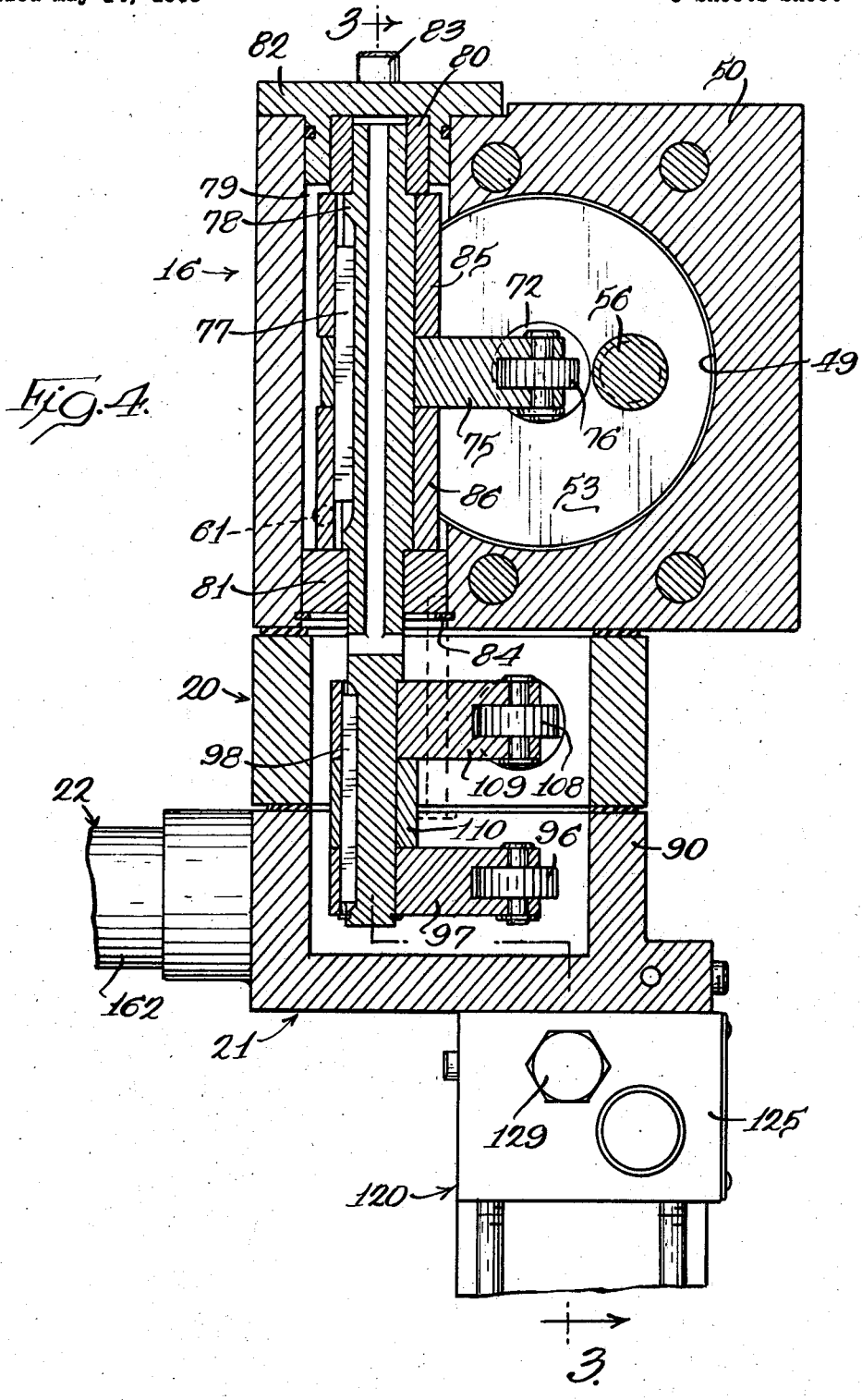

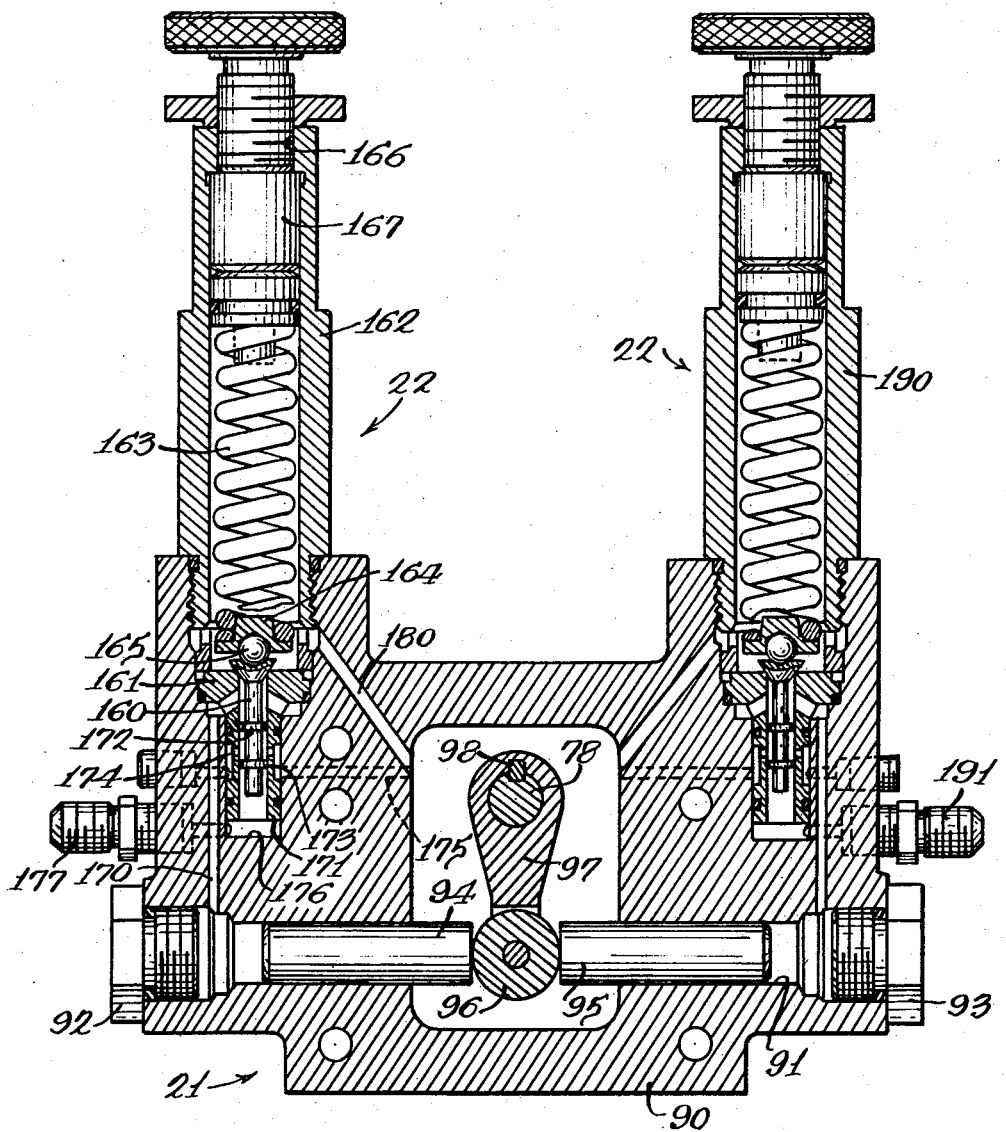

United States Patent Office 3,495,536
Patented Feb. 17, 1970

3,495,536
CONTROLS FOR FLUID TRANSLATING APPARATUS
Daniel T. Fahey, Worthington, Ohio, assignor to Rex Chainbelt Inc., a corporation of Wisconsin
Filed May 14, 1968, Ser. No. 728,972
Int. Cl. F04b 49/08, 49/00
U.S. Cl. 103—38                                    15 Claims

ABSTRACT OF THE DISCLOSURE

Controls for a fluid translating apparatus such as a variable volume hydraulic pump or motor having a stroke adjusting mechanism with a servo and feedback unit for positioning the stroke adjusting mechanism against the action of bias mechanism with the unit having a piston responsive to servo fluid pressure and having a servo valve movably mounted thereon and positionable to vary the servo fluid pressure with remotely operable valve structure for setting the servo valve to establish the servo fluid pressure and with means providing pressure compensation responsive to system pressure to vary a control fluid pressure which sets the servo valve to modify the position of the stroke adjusting mechanism when a maximum system pressure is exceeded.

BACKGROUND OF THE INVENTION

This invention relates to controls for fluid translating apparatus such as hydraulic pumps or motors to provide for volume control and pressure compensation.

SUMMARY

An object of this invention is to provide a volume control for a fluid translating apparatus having a new and improved servo and feedback unit to reduce the effort required in moving the stroke adjusting mechanism of the apparatus against inherent pumping forces and a bias mechanism.

Another object of the invention is to provide a volume control for fluid translating apparatus wherein the stroke adjusting mechanism of the apparatus is positioned against a bias force by a servo and feedback unit having a piston responsive to servo fluid pressure with a servo valve for establishing this pressure being carried directly by the piston and means for positioning the servo valve relative to the piston to establish the servo control pressure and with remotely operable means to position the servo valve relative to the piston with said servo valve being constructed to have minimum sensitivity to contamination.

A further object of the invention is to provide a control as defined in the preceding paragraph wherein a stroke adjusting mechanism is returned to a preset position if there is a failure of control pressure.

An additional object of the invention is to provide a control as defined in the preceding paragraph wherein the positioning mechanism of the servo valve is hydraulically operated including a pair of control pistons with one or the other of the control pistons being selectively responsive to a control pressure and remotely controllable solenoid valves for establishing a control pressure acting on one or the other of the control pistons.

Still another object of the invention is to provide a control as defined in the preceding paragraphs wherein pressure compensation is provided for the translating apparatus with the stroke adjusting mechanism in a position at either side of a center position to vary the volume between zero and full volume in an effort to maintain constant system pressure.

Further objects and advantages will become apparent from the following detailed description taken in connection with the accompanying drawings.

DESCRIPTION OF THE DRAWINGS

FIG. 2 is a vertical section taken generally along the line 2—2 in FIG. 1;

FIG. 3 is a section taken generally along the line 3—3 in FIG. 4 with parts shown broken away;

FIG. 4 is a vertical section taken generally along line 4—4 in FIG. 3;

FIG. 5 is a vertical section taken generally along line 5—5 in FIG. 3; and

FIG. 6 is a view of the control circuit with the components being shown by symbols.

DESCRIPTION OF THE EMBODIMENT

Figure 1:
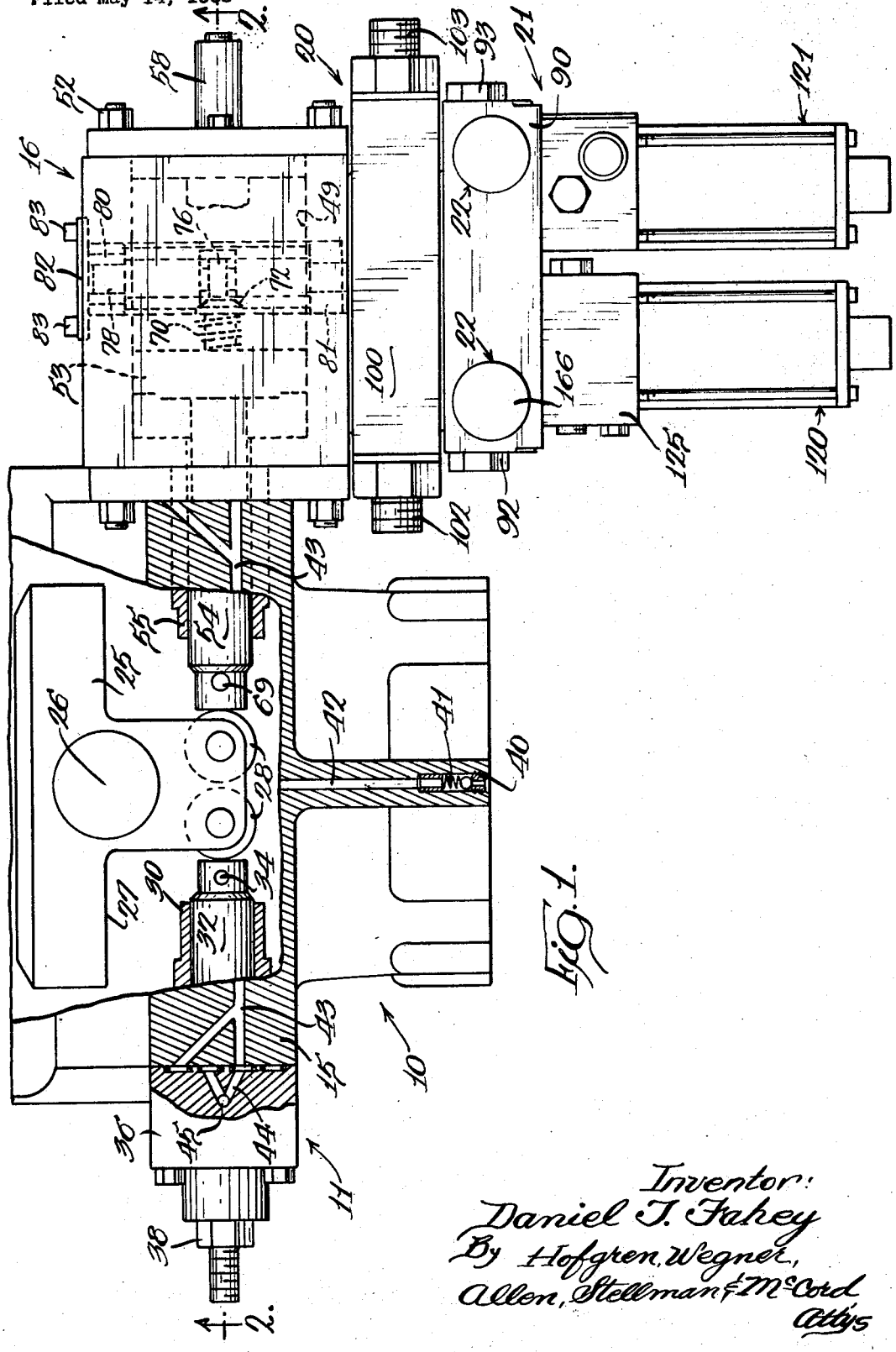
FIG. 1 is a plan view of the fluid translating apparatus with the control mechanism associated therewith and with parts shown broken away and in section.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The fluid translating apparatus with which the invention is associated is shown generally in FIGS. 1 and 2 and has a stroke adjusting mechanism for the unit which is of the variable volume type. The fluid translating apparatus is indicated generally at 10. This apparatus can be either of the "to-center" or "cross-center" type.

A number of control sections are associated with the pump or motor 10 with one section being the bias piston and cylinder assembly indicated generally at 11 suitably connected to a mounting pad 12 of the casing 15 of the fluid translating apparatus.

A second section is the linear servo and feedback unit, indicated generally at 16, and mounted on a mounting pad 17 on the casing 15 of the fluid translating apparatus. This section is shown particularly in FIGS. 1, 2, 3 and 4.

A spring centering subassembly 20 is positioned adjacent the linear servo and feedback unit 16 as shown particularly in FIGS. 1, 3 and 4.

An input actuator unit, indicated generally at 21, is mounted adjacent the spring centering unit 20 for establishing a position for the servo valve of the servo and feedback unit 16.

Structure is also provided to add pressure compensation to the fluid translating apparatus when functioning as either a pump or a motor and this mechanism is indicated generally at 22 in FIGS. 1, 4 and 5.

The fluid translating apparatus 10 has the casing 15 previously referred to and is shown generally in FIGS. 1, 2 and 3. This known type of apparatus is not shown in detail. As an example, the unit can be an axial piston unit having a rotating barrel with a plurality of linearly movable pistons and with the stroke of the pistons being controlled by a stroke adjusting mechanism. As shown in FIG. 1, this embodies a hanger or swashplate 25 which can pivot about an axis 26 to provide either no inclination or a desired inclination to a hanger face 27 against which the pistons or parts associated therewith engage to determine the stroke of the pistons. The pivoting of the hanger about the axis 26 is caused by mechanism to be described which engages bearings 28 carried on the hanger. For purpose of description, the fluid translating apparatus will herein be referred to as a pump which is of the variable volume type with the stroke adjusting mechanism referred to. It will be understood that the unit could be a motor with a supply of fluid under pressure thereto.

The hanger 25 is urged about the pivot 26 toward a maximum positive inclination by the bias piston and cylinder section 11 which includes a cylinder 30 fitted within a bore 31 in the pump casing 15 and which movably mounts a bias piston 32 having an inner end engaging with the adjacent bearing 28 carried by the hanger. The left hand end of the bias piston 32, as shown in FIG. 2, is subject to either system pressure or pilot pressure by means to be described with there being limited flow through the internal bias piston passages 33 and 34 and which is limited by the plug 35 having an orifice therein. This orifice and the piston passages vent bias pressure to the case drain of the pump and facilitates movement of the bias piston during rapid volume change conditions. In a very slow response system, the orifice could be omitted with venting of bias pressure to the case drain occurring through the clearance between the bias piston 32 and the cylinder 30 which houses the bias piston.

The end of the cylinder 30 is closed off by an end cap 36 fitted against the mounting pad 12 of the pump casing 15. This cap has a threaded stop 37 threaded therein which limits the outward movement of the bias piston 32 and thus limits the maximum negative inclination that can be imparted to the hanger 25. This stop is rotatably adjustably positioned between a range of full negative displacement of the hanger to a position of zero negative displacement for the hanger. A locking nut 38 holds the stop 37 in adjusted position.

As the system is constructed, the bias piston 32 is subject to a pressure which is the greater of either system pressure when the hanger 25 is in a positive inclination or pilot pressure when the hanger is in a negative inclination. Referring to FIG. 1, an internal port 40 receives system pressure when the hanger 25 has a positive inclination and this system pressure flows past a check valve 41 through a passage 42 formed in the casing 15 to intersect with a passage 43 in the casing leading to the end cap 36 and a passage 44 therein which intersects with a vertical passage 45 leading to the open end of the bias cylinder 30. When the hanger 25 has a negative inclination and pump discharge pressure does not communicate with the internal port 40, the transverse passage 43 connects with a source of pilot pressure provided by means external of the pump disclosed herein which connects to a fitting 46 shown in FIG. 3 leading to a bore having a check valve 47 with pilot pressure flowing past the check valve 47 to a passage 48 which intersects the transverse passage 43.

With the cross center pump herein disclosed, the bias piston 32 senses pump system pressure through internal port 40 when the hanger 25 is positive. With the relation between the check valves 41 and 47, the bias piston senses pilot pressure when system pressure at inlet port 40 is less than pilot pressure provided by an external source. The check valves port the fluid according to pressure level. It will be seen that minimum bias pressure on bias piston 32 is always at least equal to pilot pressure at fitting 46 and that the maximum bias pressure is equal to maximum system pressure at inlet port 40.

Acting in opposition to the bias piston 32 is the linear servo and feedback unit 16. This unit has a servo chamber 49 in a housing 50 closed off by a cover plate 51 attached by screws 52 to the housing 50. A stroking or power piston 53 is movably mounted within the servo chamber 49 and has a stem 54 movable within a cylindrical extension 55 of the housing 50 which fits within the bore 31 of the pump casing 15. The inner end of the stem 54 engages one of the bearings 28 carried by the hanger 25. The movement of the piston 53 to the right, as viewed in FIG. 2, and in a direction providing positive inclination of the hanger 25, is limited by an adjustable stop 56 which is threadbly mounted, as indicated at 57, through the end cap 51 with a locking member 58 surrounding the outer end of the stop member 56.

The servo chamber 49 is supplied with servo fluid control pressure through a passage 60 (FIG. 3) extending transversely through the top wall of housing 50 and having an outlet 61 opening into the servo chamber 49. A plug 62 with an orifice therein restricts fluid flow to the servo chamber but the orifice area is sufficiently large to maintain the driving force on the stroking piston 53 regardless of the position of a servo valve 65.

The servo valve 65 is carried by the stroking piston 53 (FIG. 2) with a valve end 66 of the servo valve member cooperating with a valve seat defined by the inlet end 67 of a passage 68 extending lengthwise of the piston stem 54 and intersecting a passage 69 at an inner end of the stem which connects flow through the passage to case drain of the pump. The servo valve is urged outwardly away from the valve seat by a spring 70 surrounding the servo valve which engages between a shoulder 71 on the piston 53 and a cap 72 secured to the outermost end of the servo valve and which is engaged by a member to be described. The servo valve 65 is triangular in cross-section as shown in FIG. 2 and is guided within a recess 73 formed centrally in the piston and piston stem for movement toward and away from the valve seat 67. The triangular shape of the servo valve 65 permits fluid to pass around the valve to the valve seat 67 and provides a servo control not requiring close tolerances. Also, it is not contamination sensitive and it is self cleaning because of the loose fit within the recess 73 in which it is movably mounted.

Desired response time in movement of the hanger 25 and the minimum required servo fluid pressure determine the size of the valve seat-passage inlet 67. When the servo valve 65 is wide open, the flow therethrough must be sufficient to obtain the minimum servo fluid pressure.

The primary function of the bias piston 32 and the stroking piston 53 is to act in opposition to each other to provide controlled positioning of the hanger with the bias piston applying an opposing force at all times regardless of the operating condition of the pump. As designed, the fluid translating apparatus has inherent forces acting upon the hanger 25 as a result of the pumping mechanism. These forces are variable with speed, pressure and hanger inclination. Due to these resultant pumping forces, which can act both in the positive and negative direction, the bias piston 32 assures that the hanger bearings 28 are positively forced against the stroking piston 53 at all times. Under equilibrium conditions, the force required to maintain the hanger at a given inclination is equal to the arithmetic sum of the bias and pumping forces.

The required diameter or area of the bias piston is based upon the magnitude of the inherent pumping forces and the available pilot pressure which is the minimum pressure ever exerted against the bias piston. It is sized under minimum pilot pressure at the maximum opposing force created by stroking piston 53 when the hanger 25 is at full negative inclination. Under these conditions, the force exerted by bias piston 32 must exceed the hanger forces or the hanger will remain at full negative angle when servo control pressure acting on stroking piston 53 is minimized. There must be a driving force which will overcome the hanger force when the forces resulting from servo control pressure are at a minimum.

The diameter of the stroking piston 53 is sized in conjunction with the pilot pressure to provide a force sufficient to move the hanger 25 from full positive to full negative position under any operating condition. In other words, pilot pressure times the area of the stroking piston 53 must be greater than the maximum opposing forces resulting from the bias piston and pumping forces under any condition.

As briefly stated previously, the size of the orifice in plug 62 fitted in passage 60 must be adequate to provide the required flow to the servo chamber 49 and must be sufficient to move the hanger 25 from full positive to full negative inclination while maintaining a servo chamber full of fluid and under pressure during the transient.

The spring rate of the servo valve spring is less than required to exceed the forces exerted at maximum servo fluid pressure and kept as small as possible to minimize the effect on input actuator force. A balancing piston 74 is movably mounted in passage 68 and has an end 74a engaging the servo valve 65. Servo pressure is applied to the opposite end of the balancing piston through a passage 74b in the stroking piston to thus minimize the tendency of the servo valve to close at maximum servo fluid pressure. Flow from the servo valve passes radially outward through passage 74c and to passage 68 through a second radial passage 74d.

The position of the servo valve 65 is determined by a control member in the form of a servo lever 75 positioned within the servo chamber 49 and having a roller 76 at its lower end engageable with the outer end cap 72 of the servo valve. The lever 75 is keyed by a key 77 to a shaft 78 which is rockably mounted within a bore 79 which opens into an upper part of the servo chamber. The shaft 78 is supported in a pair of bearings 80 and 81 with the bearing 80 being retained in position by an end cover 82 secured to the housing 50 by screws 83. The opposite bearing 81 is held in position by an expandable ring 84 engaged in a groove in the bore 79. A pair of spacers 85 and 86 are positioned between the lever 75 and the bearings 80 and 81 to maintain the lever accurately positioned on the shaft 78 and in alignment with the end cap 72 of the servo valve.

The rotated position of the shaft 78 and thus the inclined position of the servo lever 75 is controlled by the input actuator unit 21 shown particularly in FIGS. 3 and 4. This unit includes a housing 90 having a bore 91 extending for the length thereof with the ends closed by plugs 92 and 93 and with a pair of control pistons 94 and 95 movably mounted in the bore to function as hydraulic actuators and acting against opposite sides of a bearing roller 96 mounted on an arm 97 keyed to the shaft 78 by a key 98.

Before further describing the input actuator unit 21 and the fluid control pistons 94 and 95, reference should be made to the spring centering section 20.

This latter section has a body 100 with a passage 101 extending therethrough into which are threadably mounted a pair of tubes 102 and 103 each of which is closed at its outer end. Springs 104 and 105 are housed in tubes 102 and 103, respectively, and act against pistons 106 and 107, respectively, which have their inner ends engageable against opposite surfaces of a roller 108 carried by an arm 109 keyed to the shaft 78 and spaced from the arm 97 by a spacing collar 110. Each of the pistons has a transverse passage 111 communicating with an internal longitudinal passage 112 extending therethrough whereby the interior of the tubes is connected to the case drain. This connection is through an opening 113 in the wall of tube 102 which by way of passages 114 and 115 leads to an opening 116 into the interior of the housing 50 of the linear servo and feedback unit to the left of the piston 53, as viewed in FIG. 2, and then to the case drain.

The springs 104 and 105 act in opposition to each other and to the force applied to rock the shaft 78 by either of the pistons 94 and 95 of the input actuator unit 21. The rotation of the servo valve lever 75 is proportional to the spring rate of whichever of the springs 104 and 105 is opposing the rotation and the input command signal imparted to the shaft 78 by either of the pistons 94 and 95. When the input command signal is not present, the springs 104 and 105 center the levers and arms carried on the shaft 78 and the pump hanger 25 moves to an equilibrium position at a zero flow condition. The tubes 102 and 103 can be adjusted lengthwise of the housing 100 to allow variation in the null position of the pump. On some systems, it may be desirable to slightly unbalance the hanger 25 so that it stabilizes slightly off the null position, when there is no input command signal.

A safety feature results from the spring centering device in that if there is an electrical failure in the control pressure establishing system, the described spring centering devices take over and cause the pump output to be reduced to zero or near zero.

Returning to the input actuator section 21, one or the other of the pistons 94 and 95 can be caused to operate selectively by energization of one or the other of a pair of electrically responsive pressure setting units indicated generally at 120 and 121 in FIGS. 1 and 3. Each of these units are of the type disclosed in an application of Richard J. Clark et al., Ser. No. 545,412, filed Apr. 26, 1966. Each of these units are identical and the description of unit 120 will be described and more detailed reference thereto can be found in the copending application referred to above. A base body part 125 is connected to the body 90 of the input actuator section 21 with a transverse bore 126 housing a pressure compensated flow control valve mechanism including a valve spool 127 having an orifice passage (not shown) extending lengthwise therethrough and a spring 128 urging the valve member toward the left, as viewed in FIG. 3, with the spring acting between the valve member and a plug 129 at an end of the bore 126. A land 130 modulates fluid flow from the portion of the bore containing a spring 131.

Pilot pressure is supplied from the pilot passage 60, shown in FIG. 3, which connects to a passage 132 extending through the housing 50, the housing 100, and into the housing 90 with the transverse passage 133 connecting this passage to a passage 134 leading to the section of the bore 126 housing the spring 131. The unit 120 includes a solenoid 135 having an armature 136 connected to a poppet valve member 137 coacting with a passage 138 communicating with the valve bore 126. When the solenoid 135 is deenergized, the valve poppet 137 is free to move away from blocking relation with the passage 138 and flow coming into the valve bore through the passage 134 can flow through the valve member 127 and past the relief poppet 137. The fluid then flows through a passage 139 which connects with a passage 140 in the housing 90 to connect to the central area of the housing 90 which leads to the case drain through the tube 102 of the spring centering section.

Upon energization of the solenoid 135, the valve poppet 137 will be urged toward its seat with a certain amount of force which will establish a resistance to flow and a resulting build-up of pressure within the valve bore 126 with this pressure being transmitted by fluid in passages 141 and 142 in the housing 90 to lead to the bore 91 and against the outer end of the control piston 94. As this force exceeds the resisting force exerted by centering spring 105, the shaft 78 will be rocked in a direction to rotate servo lever 75 in a counterclockwise direction, as viewed in FIG. 2, to permit the servo valve 65 to move in a direction away from the valve seat-passage inlet 67 with the result that the flow of fluid from the servo chamber can increase to reduce the servo pressure and reduce the force acting on the stroking piston 53. This results in the bias piston being effective to move the hanger 25 in a direction to increase the positive inclination thereof. As described in the referred to copending application, the degree of energization of the solenoid 135 can be varied and as the energization increases, the magnitude of the actuator pressure acting on the piston 94 increases. Only unit 120 has been energized in the previous description with the unit 121 being deenergized. If the pump is to be stroked in the opposite direction, the operation is reversed with unit 120 being inoperative and unit 121 being energized whereby actuator pressure acts through passages 150 and 151 against the outer end of the control piston 95 to rock the shaft 78 in a direction to rotate the servo lever 75 in a clockwise direction and move the servo valve 65 toward the inlet passage 67 to reduce the opening with the result that the servo control pressure increases and the stroking piston 53 overcomes the force exerted by the bias piston 32 to move the hanger 25 in the direction of negative inclination.

The foregoing control system provides a high degree of versatility with the remote control of the volume setting of the fluid translating apparatus.

The control system also includes pressure compensation for the pump on either side of hanger center position. This provides for conservation of power and reduction of heat generation with the volume being automatically regulated from zero to the setting of the input actuator unit in accordance with system pressure which is the pressure generated by or provided to the pumping elements of the pump or motor. This is provided by the units, indicated generally at 22, with there being two of these in order to provide pressure compensation for a cross-center unit. If the fluid translating apparatus were only a "to-center" pump, then only one compensator would need to be provided and associated with the operative control piston 94 or 95.

Referring particularly to the unit 22 to provide pressure compensation when pump pressure is discharging from port A of the pump, the unit includes a poppet valve member 160 coacting with a poppet seat 161 seated in a bore in the housing 90, as shown in FIG. 5. A spring housing 162 is threaded into the bore and mounts a spring 163 which engages against a disc 164 acting against the poppet valve member through a ball 165 to urge the poppet valve member against the seat 161. A pre-load is set on the poppet valve member by the spring 163 and the amount of this pre-load can be established by an adjustment of an adjusting screw 166 threaded in an end of the housing 162 and working against a plug 167 movable in the upper end of the housing. The poppet valve member 160 is subjected to actuator pressure acting against piston 94 by way of a passage 170 communicating with the bore 91 at one end and at the other end with the underside of the poppet valve member.

The poppet seat 161 includes a cylindrical extension 171 extending downwardly in the bore and receiving a pair of lands 172 and 173 on the stem of the poppet valve. The sleeve has a series of passages 174 through the wall thereof which connect with a passage 175 leading to the interior of the housing 90 which communicates with case drain through the passages leading through spring tube 102. The lower end of the bore 176 in the housing 90 communicates with discharge from port A of the pump by a fitting 177 and the land 173 controls communication of discharge pressure with case drain through the passage 175. In operation of the pressure compensation section, the actuator pressure communicating to the poppet valve member through passage 170 has no effect because of its acting both on the poppet valve member and the land 172. The poppet valve member is solely responsive to discharge pressure through fitting 177 and when this pressure exceeds the setting established by the spring 163, the poppet valve member is caused to move upwardly off the seat 161 to permit flow through passage 170 from the bore 91 and through the opening caused by movement of the relief valve poppet whereby control or actuator pressure can bleed to case drain through a passage 180. This decreases the actuator pressure with the result that the centering spring 105 can function to urge the servo lever 75 towards a center position with resultant retracting movement of the control piston 94.

Resulting movement of the servo lever 75 causes movement of the servo valve 65 in a direction to reduce the opening to the inlet passage 67 with the result that the servo pressure increases and piston 53 can move the hanger toward a null position and cause system pressure to decrease with the result that the poppet valve 160 closes slightly. Equilibrium is established when the output of the pump is just sufficient to maintain system pressure at the level as set by the adjustment of the spring 163. The compensator varies in volume between zero and full volume as set by the input operator section in an effort to maintain constant system pressure. At system pressure below the compensator setting, full volume is obtained from the pump as set by the input operator section. During this time the poppet 160 is closed.

The other compensator unit 22 has a housing 190 which operates similarly to that just described in conjunction with piston 95 with an inlet 191 being provided for connection to the discharge port B of the pump.

It is believed that the operation will be clear from the foregoing description. However, it may be briefly summarized for clarity of understanding. Pilot pressure is applied from an external source to the input side of the pressure compensated flow control valves 127 of the input actuator units 120 and 121. This same pressure is admitted internally to the upstream side of the orifice 62 in passage 60 leading to the servo chamber of the linear servo and feedback unit 16.

At the neutral flow equilibrium position, there is no electrical input signal to either of the solenoids 135 of the units 120 and 121. The system for operating the servo lever 75 is at the null location as positioned by the centering springs 104 and 105 and no actuator pressure exists to act against either of the control pistons 94 or 95 since the poppet valves 137 of the units 120 and 121 are not restrained against opening. The servo control pressure is established by the orifice 62 in passage 60 and by the variable orifice resulting from the co-action of the servo valve 65 with the inlet 67 of the stroking piston 53. This force is at the level required to overcome the combined forces resulting from the bias piston 32 and the pumping forces acting on the hanger 25 under the existing operating condition of speed and system pressure.

When an electric signal is applied to the solenoid of unit 121, the valve poppet 137 thereof moves toward a closed position, causing an increase in the control pressure acting on the control piston 95. This piston acts against the force of centering spring 104 and rotates the actuator shaft 78 and the servo lever 75 in a clockwise direction. As the servo valve lever rotates, this tends to close the servo valve 65 with a resultant increase in servo fluid control pressure at the stroking piston 53. The force change at the stroking piston 53 upsets the equilibrium force balance and moves the hanger 25 in the negative direction. The degree of rotation of the shaft 78 and servo lever 75 is to the extent where the force exerted by control piston 95 equals the force exerted by centering spring 104. When this occurs, a new force balance is established and therefore hanger inclination is proportional to the electric input signal applied to the solenoid. If the operation is to be reversed, the solenoid 135 of the unit 120 is energized rather than of the unit 121.

When there is an increase in servo control pressure in the servo chamber resulting from movement of the servo valve 65 in a direction to reduce the opening to the inlet passage 67, there will be resulting positioning of the hanger 25 until a new balance occurs. This will result since the stroking piston 53 will be moving while the servo valve 65 remains stationary and held against the roller 76 of the servo lever 75 by the spring 70 to increase opening 67 and reduce servo pressure. When the opening to inlet passage 67 is increased sufficiently to reduce the servo control pressure until a balance is achieved with the biasing piston, then movement of the stroking piston will stop.

It is desired that a given volume or hanger inclination be maintained as set by the input signal regardless of system pressure or driving speed. Controlled feedback accomplishes this. Both bias and hanger forces change with pressure and speed and any change in the bias or hanger forces is sensed by the stroking piston 53. If there is a slight change in these forces, the stroking piston will move slightly relative to the servo valve 65. This allows more or less fluid to bleed through the opening of inlet passage 67 and the servo control force is compensated according to the direction of force change. Therefore, the hanger is maintained at a relatively constant inclination as set by the input actuator unit regardless of the opposing force magnitude or change.

The pressure compensators automatically regulate the volume by changing the actuator control pressure when the system pressure reaches the compensator setting.

I claim:

1. A control mechanism for a variable volume fluid translating apparatus comprising, a stroke adjusting mechanism, means biasing said mechanism in one direction, means for urging said mechanism in a direction opposite to said one direction including a servo and feed back unit having a piston subject to servo fluid pressure, a servo valve movably mounted on said piston and associated with a fluid passage across said piston to control flow of servo fluid through said passage, means for shifting said servo valve relative to the piston to vary the servo fluid pressure and thus the force on the piston acting on said mechanism oppositely to the biasing means including a movable member engageable with the servo valve, centering means operatively connected to said member for centering said member in a desired position, and fluid operated means to overcome said centering means and move said movable member to shift said servo valve.

2. A control mechanism as defined in claim 1 wherein said fluid operated means includes a pair of pistons, and remotely controllable valves for determining the fluid pressure applied to one or the other of said pistons to shift said member.

3. A control mechanism as defined in claim 2 wherein said centering means includes a pair of springs which become effective upon failure of pressure acting on one of said pistons.

4. A control mechanism as defined in claim 2 wherein said apparatus is a pump and pressure compensation is provided by valve means responsive to system pressure to vary the pressure applied to one of said pistons.

5. In combination, a fluid translating apparatus such as a variable volume pump or motor having a movable volume changing member, a servo mechanism for operating said volume changing member between full positive and full negative positions including a power piston responsive to servo fluid pressure, and a servo valve for establishing the effective servo pressure and responsive to piston movement to provide a feed back as to position of said piston, and remotely operable means for setting the servo fluid pressure by positioning of the servo valve to have the member at any position between full positive and full negative.

6. A combination as defined in claim 5 including means to position said volume changing member at a predetermined position upon failure of said remotely operable means.

7. A combination as defined in claim 5 wherein said remotely operable means is fluid operated and pressure compensation means responsive to pump pressure to modify the operation of said remotely operable means by modifying the pressure of the fluid involved in operation thereof.

8. A control mechanism for a variable volume fluid translating apparatus having a stroke adjusting mechanism; comprising, fluid pressure means biasing said mechanism in one direction; means for urging said mechanism in a direction opposite to said one direction including a servo and feed back unit having a piston in a chamber and operatively engageable with said mechanism and subject to servo fluid pressure with a flow passage therethrough, a servo valve movably mounted on said piston for controlling servo fluid flow from said chamber through said passage, and means urging said servo valve away from said passage to permit flow therethrough; and means for positioning said servo valve relative to said passage and operable in opposing relation to said urging means including a movable control member engageable with said servo valve, means for moving said control member in response to a control fluid pressure, and means for positioning said control member in a preset position in the absence of control fluid pressure.

9. A control mechanism as defined in claim 8 wherein said means for moving said control member includes a pair of control pistons arranged in opposed relation and operatively connected to said control member whereby application of control fluid pressure to one of said control pistons will cause corresponding movement of the control member.

10. A control mechanism as defined in claim 9 wherein each of said control pistons has a remotely settable valve associated therewith for establishing the control fluid pressure.

11. A control mechanism as defined in claim 9 having a pair of pressure responsive valves responsive to system pressure and each in fluid communication with a respective one of said control pistons for selective connection thereof to a case drain whereby excess system pressure will cause reduction in control fluid pressure by flow of control fluid to case drain.

12. A control mechanism as defined in claim 9 having a rockable shaft, said control member being mounted on said rockable shaft in said chamber and in alignment with said servo valve, an arm depending from said shaft at a distance from said control member, and said control pistons being positioned one at each side of said arm.

13. A control mechanism as defined in claim 12 wherein a second arm depends from said rockable shaft and a pair of adjustable settable spring urged plungers engageable with opposite sides of said second arm for centering said shaft and control member when said control pistons are inoperative.

14. A control mechanism for a variable volume fluid translating apparatus comprising, a stroke adjusting mechanism, means biasing said mechanism in one direction, means for urging said mechanism in a direction opposite to said one direction including a servo and feed back unit having a piston subject to servo fluid pressure, a cylindrical recess in said piston, a servo valve movably mounted in said piston recess and associated with a fluid passage opening in said piston to control flow of servo fluid through said passage, said servo valve having a triangular cross-section to admit fluid to said piston opening through said recess and avoid the necessity for close tolerance, and means for shifting said servo valve relative to the piston to vary the servo fluid pressure and thus the force on the piston acting on said mechanism oppositely to the biasing means.

15. A control mechanism for a variable volume fluid translating apparatus comprising, a stroke adjusting mechanism, means biasing said mechanism in one direction, means for urging said mechanism in a direction opposite to said one direction including a servo and feed back unit having a piston subject to servo fluid pressure, a poppet servo valve movably mounted on said piston and associated with an inlet of a fluid passage through said piston to control flow of servo fluid through said passage, means connecting the outlet side of said fluid passage to case drain of the apparatus, and means for shifting said servo valve relative to the piston passage inlet to vary the rate of flow of servo fluid through the passage to case drain and therefore vary the servo fluid pressure and thus the force on the piston acting on said mechanism oppositely to the biasing means.

References Cited

UNITED STATES PATENTS

| | | | |
|---|---|---|---|
| 2,588,866 | 3/1952 | Moon | 60—53 |
| 3,051,092 | 8/1962 | Lambeck. | |
| 3,381,624 | 5/1968 | Born | 103—38 X |
| 3,412,683 | 11/1968 | Anderson | 103—38 |

LEONARD H. GERIN, Primary Examiner